United States Patent [19]

Azuma et al.

[11] Patent Number: 4,507,690

[45] Date of Patent: Mar. 26, 1985

[54] DEVICE FOR CONTROLLING CONSECUTIVE RECORDING OF VIDEO INFORMATION SIGNALS FROM VIDEO CAMERA

[75] Inventors: Nobuo Azuma; Kenji Satoh, both of Yokohama; Katsuo Mohri, Yokosuka; Takashi Furuhata, Yokohama, all of Japan

[73] Assignee: Hitachi, Ltd., Tokyo, Japan

[21] Appl. No.: 382,104

[22] Filed: May 26, 1982

[30] Foreign Application Priority Data

May 29, 1981 [JP] Japan .................................. 56-81004

[51] Int. Cl.³ .............................................. H04N 5/78
[52] U.S. Cl. .................................. 360/33.1; 358/906; 360/14.3
[58] Field of Search ............... 358/310, 311, 321, 906; 360/14.1, 14.2, 14.3, 33.1, 35.1, 70

[56] References Cited

U.S. PATENT DOCUMENTS

| | | | |
|---|---|---|---|
| 3,974,522 | 8/1976 | Fukatsu et al. ................. | 358/906 X |
| 4,007,490 | 2/1977 | Shoda ................................. | 360/33.1 |
| 4,340,903 | 7/1982 | Tamura ............................... | 360/33.1 |
| 4,358,797 | 11/1982 | Nishijima et al. .................. | 360/14.2 |
| 4,386,376 | 5/1983 | Takimoto et al. .................. | 360/33.1 |

Primary Examiner—Donald McElheny, Jr.
Attorney, Agent, or Firm—Antonelli, Terry & Wands

[57] ABSTRACT

A device for controlling consecutive recording of video information containing signals, on a magnetic recording medium in a magnetic recording and reproducing apparatus, fed from a video camera with variable time spacing. The device comprises a control switch rendered non-conductive or conductive when a pause switch in the magnetic recording and reproducing apparatus is actuated or released, and a member for initializing a sync signal generator in the video camera with a signal produced in synchronism with the rotation of a head carrying disc driving motor of the magnetic recording and reproducing apparatus, whereby energy consumption is lowered and synchronization between successive video information signals is attained rapidly during the consecutive recording of video information signals from the video camera.

6 Claims, 4 Drawing Figures

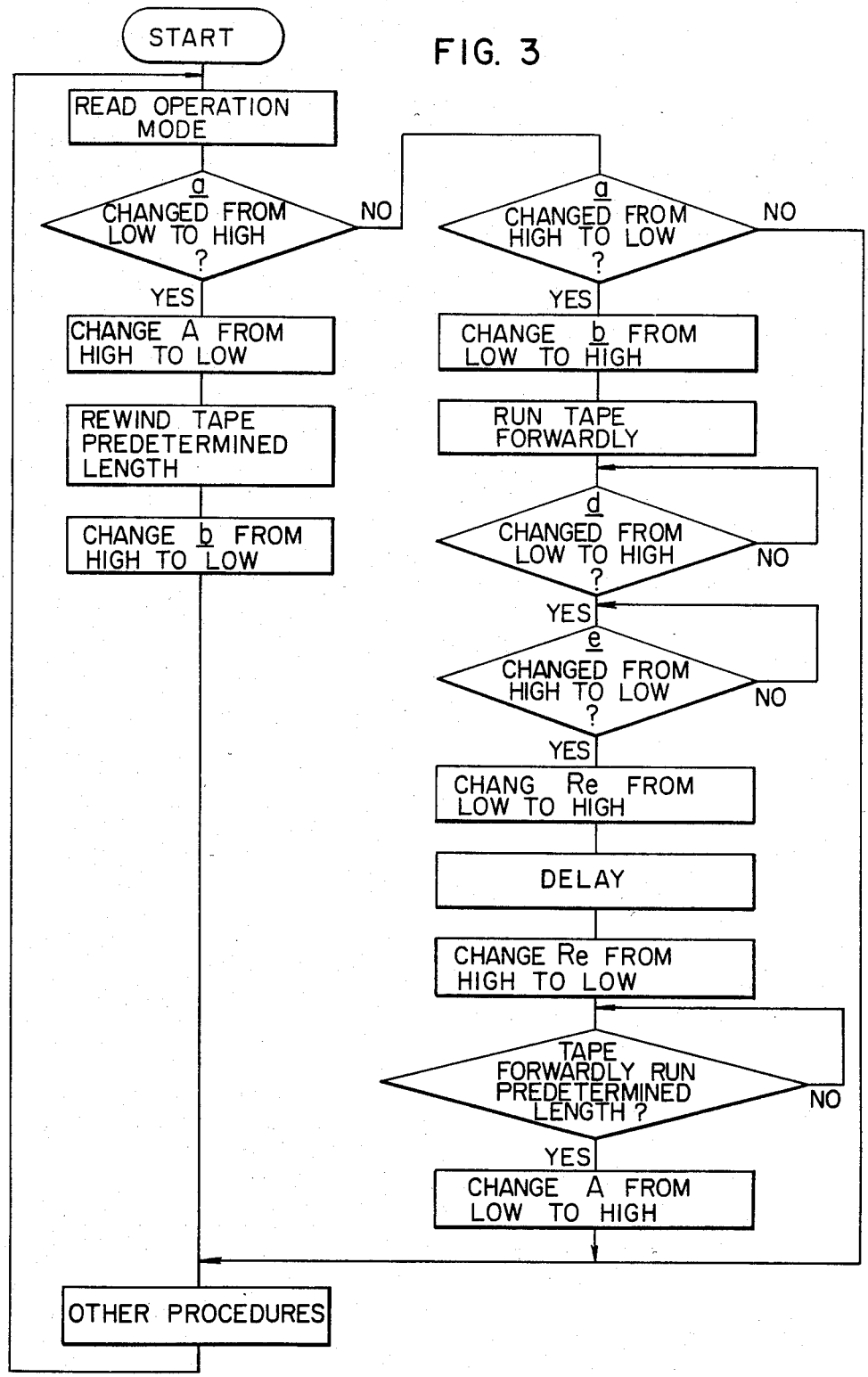

DEVICE FOR CONTROLLING CONSECUTIVE RECORDING OF VIDEO INFORMATION SIGNALS FROM VIDEO CAMERA

BACKGROUND OF THE INVENTION

This invention relates to a device for controlling consecutive recording of a plurality of independent signals, which contain video information and are supplied from a video camera with a various time space, on a magnetic recording medium in a magnetic recording and reproducing apparatus. In this specification, such recording will hereinafter be referred to simply as "consecutive recording of independent video information containing signals" for the sake of convenience.

The VTR for recording and reproducing video and audio signals has a function of making the magnetic tape pause (temporarily stop) in order to record only desirable scenes. However, random pause and resumption of recording (or resumption of recording from the stop mode) will cause a dropout and out-of-synchronization between reproduced pictures at the junction of pictures.

Thus, there has been used so far a "tape rewinding" consecutive recording method in which the magnetic tape is rewound a bit at each pause, and after release from the pause the synchronizing signal supplied from the video camera to be recorded is phase synchronized with a reproduced control signal, and then the normal recording mode is resumed. For example, refer to U.S. patent application Ser. No. 123,644 (filed on Feb. 22, 1980) now U.S. Pat. No. 4,358,797.

In the conventional consecutive recording method, however, the motor, the electric circuitry and the video camera connected to or incorporated into the VTR are continuously powered irrespective of whether the VTR is in the pause operation mode or in the recording/reproducing operation mode, and therefore power will be uselessly consumed.

This useless power consumption in the commercial—AC operated VTR does not matter in particular, but that in the battery (or storage battery)—operated portable VTR becomes serious because the effective recording time with a single fully charged battery is reduced due to the useless power consumption, and as a result, for a necessary battery capacity the volume and weight of the battery are increased, causing a problem in attempts to reduce the size of the device.

Thus, in the prior art device, when a pause operation mode lasts longer than about three minutes, the stop mode is forcibly brought about. However, in the usual situation in which scenes are practically taken with a video camera, one cut of taking a scene is relatively short and the pause period of time is relatively long in most cases, with an undesirable result that some scenes expected to be picked up have not actually been recorded due to voltage drop in a discharged battery.

Moreover, a relatively long time is required to carry out consecutive recording of independent video information containing signals to the effect that adjacent independent video information containing signals are phase-synchronized.

SUMMARY OF THE INVENTION

Accordingly, it is an object of this invention to provide a consecutive recording control device for a VTR, obviating useless power consumption during a pause operation mode, signal dropout and out-of-synchronization at the junction of pictures.

According to one of the major aspects of this invention, in order to attain the above-mentioned object, after procedures for entering a pause operation mode, a part or the whole of electric power being supplied to the VTR and the video camera is cut off, the cut off of the electric power is stopped to resume the power supply immediately after the pause operation mode is terminated, and the sync signal generator in the video camera is reset with a signal generated in synchronism with the rotation of a rotary head disc driving motor in the VTR, thereby reducing the phase synchronization time which has been conventionally long. As a result, the VTR becomes ready for the consecutive recording of independent video information containing signals in a short time, without useless electric power consumption.

BRIEF DESCRIPTION OF THE DRAWINGS

Embodiments of this invention will be described with reference to the accompanying drawings, in which:

FIG. 3 is a flow chart of the operation of the embodiment of FIG. 1; and

DETAILED DESCRIPTION

Figure 1:
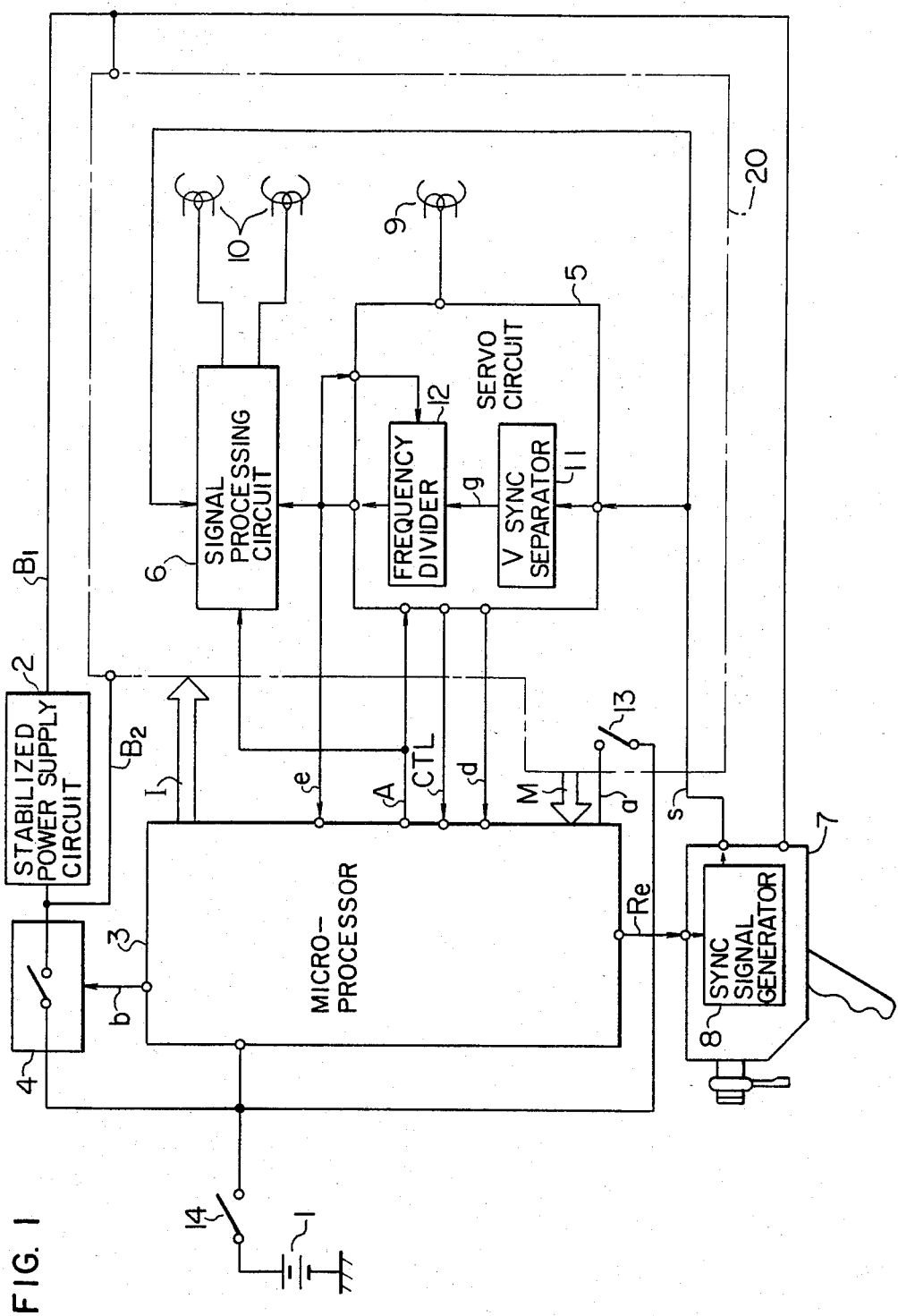
FIG. 1 is a block diagram of an embodiment of this invention.

Referring to FIG. 1, reference numeral 7 represents a video camera including a synchronizing signal generator 8, and serving to supply to a magnetic recording and reproducing apparatus (here, a VTR) 20 a signal s containing video information. The apparatus 20 has a signal processing circuit 6 for processing the signal s from the video camera 7, video heads 10 (here, two heads) which are supplied with the output from the circuit 6 and record it on a magnetic recording medium (here, a magnetic tape not shown) or reproduce (read) information signals recorded on the magnetic recording medium, a servo circuit 5 for controlling the rotating speed and the phase of the rotation of the video head 10, and a control head 9 connected to the servo circuit 5 so as to record and reproduce a control signal necessary for the recording and reproduction of a video information signal by the video head 10. Reference numeral 13 represents a pause switch for setting the apparatus 20 to a pause operation mode. The servo circuit 5 comprises a vertical synchronizing signal separating circuit 11 for deriving the vertical synchronizing signal from the signal s supplied from the video camera 7, and a frequency-divider 12 for halving the frequency of the output from the circuit 11.

The consecutive recording control apparatus includes control switching means 4 disposed between a power source 1 and the magnetic recording and reproducing apparatus 20 and video camera 7 so that parts of or the whole of the apparatus 7 and the video camera 20 are connectable to the power source 1 through the means 4; a microprocessor 3 as means for rendering the control switching means 4 non-conductive in response to actuation of the pause switch and for rendering the control switching means 4 conductive in response to restoration of the pause switch 13, respectively, thereby stopping and resuming part or all of the power to be supplied to the apparatus 20 from the power source 1 and to the apparatus 20 and video camera 7 through a stabilized power circuit 2 (i.e., generation of power control signal b); and the microprocessor 3 as means for initializing the synchronizing signal generator 8 of the video camera 7 by using the signal e generated at the servo circuit 5 in synchronism with the rotation of the motor (not shown) for driving (rotating) the disc (not shown) which supports the head 10. The microprocessor 3 serves to control the on-off operation of the control switching means 4 and initialize the synchronizing signal generator 8 with signal e produced in synchronism with the rotation of a motor (not shown) for driving (rotating) a disc (not shown) supporting the heads 10. The microprocessor 3 serves not only to on-off control the control switching means 4 and to initialize the sync signal generator 8 but also to control the operation of the recording and reproducing apparatus 20. Although the on-off control of the control switching means 4 and the initialization of the synchronizing signal generator 8 can be performed by respective known means, the microprocessor is preferably used. For example, a commercially available 4-bit one-chip microprocessor HMCS 45C (made by Hitachi) may be used. Reference numeral 14 represents a main power switch for the microprocessor 3, magnetic recording and reproducing apparatus 20 and video camera 7. When the main switch 14 is closed, the microprocessor 3 and pause switch 13 are always in the enabled state.

The operation of the arrangement of FIG. 1 will hereinafter be described with reference to the waveform chart of FIG. 2 and the flow chart of FIG. 3.

First, when the main switch 14 is closed, the microprocessor 3 reads the mode of operation of the apparatus 20.

Figure 2:
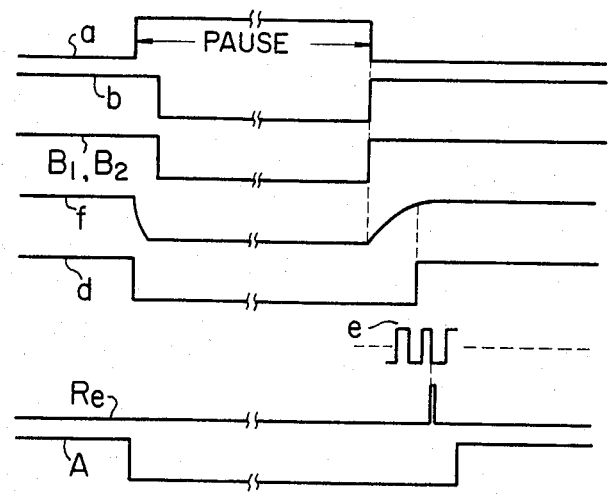
FIG. 2 is a waveform diagram of signals observed in the embodiment of FIG. 1.

When the pause switch 13 is operated to issue a pause command during a recording mode of operation, pause signal a is changed from level "L" (low) to "H" (high) as shown in FIG. 2 and therefore the microprocessor 3 operates to change consecutive recording signal A supplied to the circuit 6 and servo circuit 5 of the VTR 20 from "H" to "L", supplies command signal I to the VTR 20 to set the VTR 20 in a pause mode of operation so that recording of signals on the magnetic tape is stopped and causes the VTR 20 to rewind the magnetic tape a predetermined length for the "tape rewinding" consecutive recording. Then, power cut-off signal b (FIG. 2) to the control switching means 4 is changed from "H" to "L" to open the control switching means 4, thereby cutting off power supply outputs $B_1$ and $B_2$ (FIG. 2) to part or the whole of the video camera 7 and the VTR 20. The microprocessor 3 and the pause switch 13 are still in the enabled state as described above. Here, $B_1$ represents a non-stabilized power output, and $B_2$ a stabilized power output. At this time, the motor of the VTR is stopped from rotation.

When the pause switch 13 is released from the pause state, or when the pause signal a is changed from "H" to "L", the microprocessor 3 immediately changes the power cut-off signal b from "L" to "H" to allow the power outputs $B_1$ and $B_2$ to be supplied to the respective portions, thereby causing the disc motor and capstan motor (not shown) to start rotation in the forward direction.

When the rotation speed f of the disc motor increases up to a predetermined value, the servo circuit 5 detects this fact from lock-in of a speed control loop (not shown) provided in the servo circuit 5 (for example, from the error signal in the speed control loop having been reduced down to a given value), produces motor rise signal d (FIG. 2) and supplies it to the microprocessor 3. The microprocessor 3 produces reset signal Re in response to the fall of the first pulse in the head switching signal e after the motor rise signal d is changed exactly to "H", i.e., after the disc motor "rises up". Namely, when the head switching signal e is changed from "H" to "L", the reset signal Re is changed from "L" to "H" and, after a predetermined length of time (delay), is changed back to "L", to generate a pulse of the reset signal Re. The head switching signal e is a signal generated in response to rotation of the disc motor, and produced from the disc tachometer pulses (not shown) representative of the rotation phase of the disc motor.

This reset signal Re is supplied from the microprocessor 3 to the synchronizing signal generator 8 in the video camera 7 to reset or initialize the circuit 8, thereby forcibly phase synchronizing the video camera 7 with the VTR 20. Thereafter, the motor is finally rotated forward by an amount corresponding to the predetermined rewound tape length as mentioned, and the consecutive signal A is changed back from "L" to "H" to start recording of signals on the magnetic tape.

While the consecutive signal A is kept as "L", the recording on the magnetic tape is inhibited even though the servo circuit 5 is in the consecutive recording mode of operation. Meanwhile, in the servo circuit 5, during the time period from a termination of a pause (a change of the pause signal a from "H" to "L") to a change of the consecutive recording signal A from "L" to "H", a process is being effected for the phase synchronization between the recorded control signal and the synchronizing signal to be recorded from the video camera 7.

Since the synchronizing signal generator 8 in the video camera 7 is reset by the head switching signal e representative of the rotation phase of the disc motor, it is possible to achieve in a short time the phase synchronization between the synchronizing signal as a reference signal and the head switching signal even when a slow response disc motor is used and therefore the phase synchronization process has not yet been finished in the servo circuit 5 before the above-mentioned initialization of the synchronizing signal generator 8.

The signal processing circuit 6 is controlled by the consecutive recording signal A supplied at its so-called REC-START terminal of the VTR 20. Although the same effect is obtained even if the reset pulses are supplied to the video camera 7 for a predetermined period of time during the consecutive recording process which the servo circuit performs, the reproduced picture monitored during recording by an electronic view finder or the like may be disturbed by the reset pulses. Thus, preferably, 1 to 3 reset pulses are used for the reset or initialization of the generator 8.

Generally, in the servo circuit 5, the vertical synchronizing signal of about 60 Hz is converted into a signal of about 30 Hz for the purpose of rotating the disc motor at about 30 Hz. In other words, the signal s obtained from the video camera 7 is supplied to the servo circuit 5, where the vertical synchronizing signal g is separated therefrom at the vertical synchronizing signal separator 11, and then divided in frequency substantially by 2 into a signal of about 30 Hz. Thus, if the synchronizing signal generator 8 of the video camera is reset but the frequency divider 12 of the servo circuit 5 is not reset, the signals of about 60 Hz and 30 Hz are not necessarily phase synchronized, with a result that satisfactory consecutive recording will not be possible. In this case, it is necessary to reset the frequency divider 12 with the head switching signal e or reset signal Re at the same time when the video camera 7 is reset, to initialize the divider 12 so as to permit the vertical synchronizing signal from the video camera and the head switching signal to have a predetermined phase.

In this embodiment, to ensure rewinding of a predetermined length of the tape and forward running (at a normal speed) for the "tape rewinding" consecutive recording, the reproduced control pulse signals CTL from the control head 9 are counted by the microprocessor 3. In other words, when the consecutive recording signal A is changed from "H" to "L" and a predetermined length of tape is rewound, control pulses corresponding to the predetermined rewound tape length are counted. For the "tape rewinding" consecutive recording, the length of tape or the time period for the forward running is determined such that the number of reproduced control pulses CTL counted during the forward running effected between a termination of a pause and a change of the consecutive recording signal from "L" back to "H" is equal to the above-mentioned counted value of the control pulse at the tape rewinding.

Except for the consecutive recording of independent video information containing signals, the VTR is controlled according to the other procedures routine as shown in FIG. 3, and then the operation mode read routine is re-started to repeat the loop.

Further, in FIG. 1, symbol M represents operation mode command signals such as a recording operation mode and a reproducing operation mode for the VTR 20, similar to the pause operation mode command signal a, and these command signals are fed to the microprocessor 3 by actuation of, e.g., push-button switches provided on the VTR. Meanwhile, the symbol I represents control signals to be applied to the VTR from the microprocessor to set the VTR in the operation mode corresponding to one of the operation command signals M.

Figure 4:
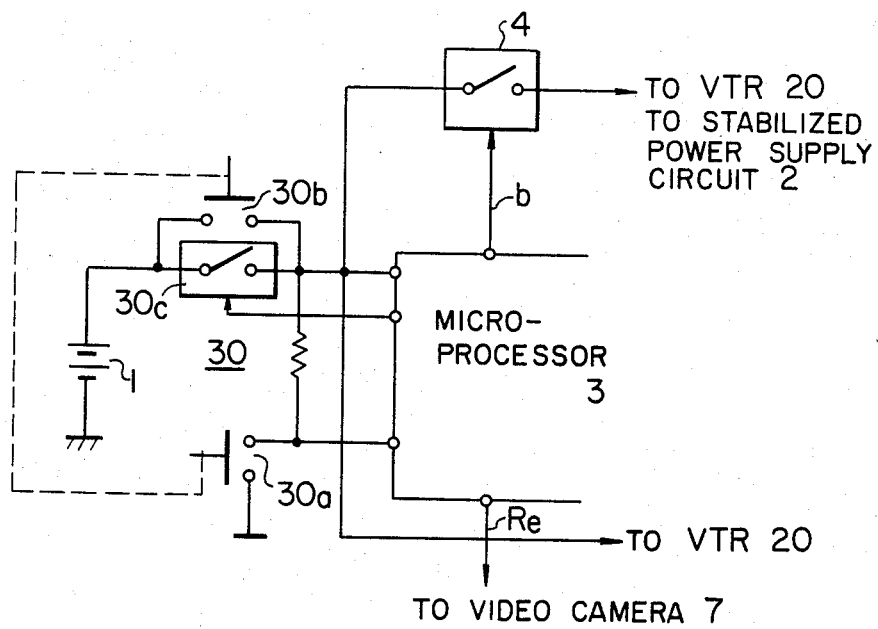
FIG. 4 is a block diagram of another embodiment of this invention.

FIG. 4 is a modification of the embodiment of FIG. 1. This modification is different from the arrangement of FIG. 1 in that a self-holding switch 30 is employed for the main power switch 14. The other parts are the same. In FIG. 4, when a normally open switch 30a is pushed, another normally open switch 30b is closed being interlocked therewith, so that the microprocessor 3 is connected to the power source 1. Consequently, the microprocessor 3 causes the switch 30c to be closed, so that power can be supplied to the microprocessor 3, VTR 20, and video camera 7 through the switch 30c even if the normally open switches 30a and 30b are opened. Further, with the microprocessor 3 being powered from the power source 1, when the normally open switch 30a is again pushed, the microprocessor 3 now causes the switch 30c to be opened. Thus, the microprocessor 3 will be disconnected from the power source 1 when the normally open switch 30a and the normally open switch 30b interlocked therewith restore their normal open states.

This invention can be used not only in the case where the video camera is connected to the VTR by a cable but also particularly for a set in which the video camera and VTR are combined.

When a solid-state image sensor is used for a video camera, the power to be supplied to the video camera 7 can be cut off completely with no trouble, but when a tube type image sensor is used, only the heater may be always supplied with current in a recording operation mode for improving the response time, and the other electric circuits than the heater disconnected from the power source.

According to this invention, as described above, electric power to be supplied to the VTR and video camera can be cut off without causing trouble to the VTR in the consecutive recording operation mode in which recording is interrupted by pauses, so that the useless power which has been consumed so far can be reduced to a great extent and the time from the release from the pause to the begining of the actual recording including the consecutive recording process can be prevented from being long.

We claim:

1. A device for controlling consecutive recording of video information containing signals on a magnetic recording medium in a magnetic recording and reproducing apparatus including a motor for driving head carrying means and a pause switch for setting the apparatus in a pausing operation mode, said video information containing signals being fed to said apparatus with variable time spacing from a video camera including a sync signal generator, comprising:
control switching means, at least parts of said apparatus and said video camera being connectable with a power source through said control switching means;
means for rendering said control switching means non-conductive in response to actuation of said pause switch and for rendering said control switching means conductive in response to release of said pause switch; and
means for initializing said sync signal generator with a signal produced in synchronism with the rotation of said head carrying means driving motor.

2. A controlling device according to claim 1, in which the device further comprises means for phase synchronizing a vertical sync signal from said sync signal generator with said signal produced in synchronism with the rotation of said head carrying means driving motor.

3. A controlling device according to claim 1 or 2, in which said signal produced in synchronism with the rotation of said head carrying means driving motor contains at least one pulse.

4. A controlling device according to claim 1, in which the device further comprises a self-holding switch as a main switch serving to power therethrough and via said control switching means said apparatus and said video camera.

5. A controlling device according to claim 1, in which a microprocessor constitutes said means for rendering said control switching means non-conductive or conductive and said initializing means.

6. A device for controlling consecutive recording of video information containing signals on a magnetic recording medium in a magnetic recording and reproducing apparatus including rotary heads, a motor for driving head carrying means, magnetic medium drive means, servo circuit means for controlling the speed and phase of said head carrying means driving motor, and a pause switch for setting the apparatus in a pausing operation mode, said servo circuit means being capable of detecting the rotation speed of said head carrying means driving motor, said video information containing signals being fed to said apparatus with variable time spacing from a video camera including a sync signal generator, comprising:

control switching means, at least parts of said apparatus and said video camera being connectable with a power source through said control switching means;

means responsive to an actuation of said pause switch for causing said magnetic medium drive means to reversely drive said magnetic medium for a predetermined amount of motion and thereafter rendering said control switching means non-conductive, and responsive to release of said pause switch for rendering said control switching means conductive and thereafter causing said magnetic medium drive means to forwardly drive said magnetic medium and causing said head carrying means driving motor to drive said head carrying means for normal forward motion of said magnetic medium;

means arranged for connection with said servo circuit means for detecting that the rotation speed of said head carrying means driving motor exceeds a predetermined value after release of said pause switch;

means arranged for connection with said servo circuit means for producing a reset signal in synchronism with the rotation of said head carrying means driving motor in response to the output of said detection means and resetting and initializing said sync signal generator with said reset signal to thereby forcibly make the phase of operation of said video camera coincident with that of said apparatus; and means for setting said apparatus in a recording operation mode when said magnetic medium, after release of said pause switch, has been driven forwardly an amount of motion substantially identical with the reversely driven amount of motion.

* * * * *